United States Patent
Quakenbush et al.

(10) Patent No.: US 10,637,390 B1
(45) Date of Patent: Apr. 28, 2020

(54) ANALOG SWITCHING CURRENT DRIVE

(71) Applicant: Ball Aerospace & Technologies Corp., Boulder, CO (US)

(72) Inventors: Timothy K. Quakenbush, Longmont, CO (US); Cameron L. Mock, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 45 days.

(21) Appl. No.: 15/813,661

(22) Filed: Nov. 15, 2017

Related U.S. Application Data

(60) Provisional application No. 62/423,022, filed on Nov. 16, 2016.

(51) Int. Cl.
| | | |
|---|---|---|
| *H02P 29/40* | (2016.01) | |
| *H02M 1/12* | (2006.01) | |
| *H02P 27/06* | (2006.01) | |
| *B62D 5/04* | (2006.01) | |
| *H02P 21/22* | (2016.01) | |
| *H02P 8/12* | (2006.01) | |
| *H02P 6/08* | (2016.01) | |
| *H02P 6/34* | (2016.01) | |
| *H02P 25/22* | (2006.01) | |

(52) U.S. Cl.
CPC ............ *H02P 29/40* (2016.02); *H02M 1/126* (2013.01); *H02P 27/06* (2013.01); *H02P 6/08* (2013.01); *H02P 6/34* (2016.02); *H02P 8/12* (2013.01); *H02P 21/22* (2016.02); *H02P 25/22* (2013.01)

(58) Field of Classification Search
CPC .... H02P 1/46; H02P 5/753; H02P 9/06; H02P 29/40; H02P 27/06; H02P 25/22; H02P 21/22; H02P 8/12; H02P 6/08; H02P 6/34; H02M 1/126
USPC .................................................. 318/45, 685
See application file for complete search history.

(56) References Cited

U.S. PATENT DOCUMENTS

| | | |
|---|---|---|
| 468,953 A | 2/1892 | Lundell |
| 794,998 A | 7/1905 | Mott |
| 3,956,651 A | 5/1976 | Brammerlo |
| 5,051,637 A | 9/1991 | Harris et al. |
| 5,095,237 A | 3/1992 | Bardas et al. |
| 5,550,669 A | 8/1996 | Patel |

(Continued)

FOREIGN PATENT DOCUMENTS

| | | |
|---|---|---|
| CA | 2334662 A1 | 12/1999 |
| EP | 1420498 A1 | 5/2004 |

*Primary Examiner* — Bickey Dhakal
*Assistant Examiner* — Zemenay T Truneh
(74) *Attorney, Agent, or Firm* — Sheridan Ross P.C.

(57) ABSTRACT

Motor driver systems and methods with relatively low electromagnetic interference characteristics are provided. The system includes a motor or other capacitive load with single or multiple phases. Each phase of the motor is connected to a motor phase controller. Each motor phase controller includes a first voltage control loop, a second voltage control loop, and a current control loop. The first and second voltage control loops are nested within the current control loop. The voltage control loops can be configured to control a resonance peak in a frequency response of the motor, while the current control loop can be configured to control a notch in a frequency response of the motor.

18 Claims, 8 Drawing Sheets

(56) References Cited

U.S. PATENT DOCUMENTS

| | | | |
|---|---|---|---|
| 6,579,315 B1* | 6/2003 | Weiss | A61M 1/127 |
| | | | 607/65 |
| 6,856,437 B2 | 2/2005 | Witt et al. | |
| 6,960,860 B1 | 11/2005 | DeCristofaro et al. | |
| 7,579,723 B2 | 8/2009 | Toyoda et al. | |
| 8,593,712 B2 | 11/2013 | Eto et al. | |
| 8,716,915 B2 | 5/2014 | Radov et al. | |
| 8,901,798 B2 | 12/2014 | Ramu et al. | |
| 9,354,422 B1 | 5/2016 | Quakenbush | |
| 2006/0250207 A1 | 11/2006 | Shudarek | |
| 2009/0097144 A1 | 4/2009 | Oehlke et al. | |
| 2017/0012569 A1* | 1/2017 | Koseki | H02P 25/22 |

* cited by examiner

ANALOG SWITCHING CURRENT DRIVE

CROSS-REFERENCE TO RELATED APPLICATIONS

This application claims the benefit of U.S. Provisional Patent Application Ser. No. 62/423,022, filed Nov. 16, 2016, the entire disclosure of which is hereby incorporated herein by reference.

FIELD

This disclosure is directed toward an analog switching current drive design that provides a high bandwidth, switching motor driver for motors or other loads with a high parasitic capacitance, while eliminating sources of electromagnetic interference.

BACKGROUND

Switching motor drivers connected to large motors with high parasitic capacitance generate substantial noise current and voltage in the cable to the motor. That noise is a well-known source of electromagnetic interference (EMI) to nearby equipment. Previous approaches attenuate, but do not eliminate, this problem by using one or more of the following techniques: installing ferrite beads on cables connecting driver to motor, applying a snubber filter with aggressive shielding, using a low capacitance motor, using linear amplifiers, and using rate controlled switching amplifiers.

The disadvantages of ferrite beads and snubber filters include an inability to mitigate EMI at a level required for aircraft and military applications. In addition, available filters and properly terminated cable shields only reduce or contain the EMI problem until corrosion on shield terminations occurs. Similarly, aggressive shielding poses a high EMI risk after several years due to corrosion. Low capacitance motors, which can feature air or epoxy cores in place of soft magnetic materials, have a much lower torque per mass and lower efficiency than motors having magnetic cores. Linear or rate controlled switching amplifiers consume much more power than alternative amplifiers, are relatively inefficient, require large heat sinks, and become impractical at higher current levels. Moreover, linear amplifiers have a significantly lower bandwidth, are only used in low speed applications, and are typically unsuitable for anything other than relatively small motors. Accordingly, it would be desirable to provide a motor driver capable of powering relatively high capacitance motors while exhibiting acceptably low levels of EMI radiation, and that did not require EMI mitigation measures that were unreliable or that required compromised motor or driver configurations.

SUMMARY

Embodiments of the present disclosure are directed to an analog switching current drive (ASCEND) device or driver device that provides a Class D switching motor driver capable of supplying high current, high bandwidth, and low cost control of motors or other resistive, inductive, and capacitive loads, while significantly reducing or eliminating EMI radiation. Embodiments of the driver device disclosed herein can effectively address the EMI problem created by switching drivers connected to motors with large parasitic capacitance. In particular, embodiments of the present disclosure provide a nested controls solution that turns the electrical resonance behavior of the driver circuit into an advantage, eliminating or reducing EMI in applications where a switching motor driver connects to a motor with high parasitic capacitance.

A driver device in accordance with embodiments of the present disclosure features nested control loops. More particularly, for each phase of a driven motor, the device driver includes a pair of voltage control loops nested within a current control loop. In accordance with embodiments of the present disclosure, a current command is provided to the device driver for each phase of the motor. The current command for a phase of the motor is received at a respective current control loop of the device driver. The current control loop provides a current signal to a first nested voltage control loop, and an inverse current signal to a second nested voltage control loop. The first nested voltage control loop provides a first drive voltage (e.g. a positive drive voltage) to a first pole of a first phase of the motor, while the second nested voltage control loop provides a second drive voltage (e.g. a negative drive voltage) to a second pole of the first phase of the motor. A voltage amount at each of the poles is provided as a feedback signal to the respective voltage control loops, and an amount of current across the phase of the motor is sensed and provided as a feedback to the current control loop. Duplicate nested control loops are provided for each phase of the motor. This configuration allows for a relatively high capacitance motor to be driven, without generating objectionable levels of EMI in the driver circuit.

Additional features and advantages of embodiments of the disclosed invention will become more readily apparent from the following description, particularly when taken together with the accompanying drawings.

DETAILED DESCRIPTION

Figure 1:
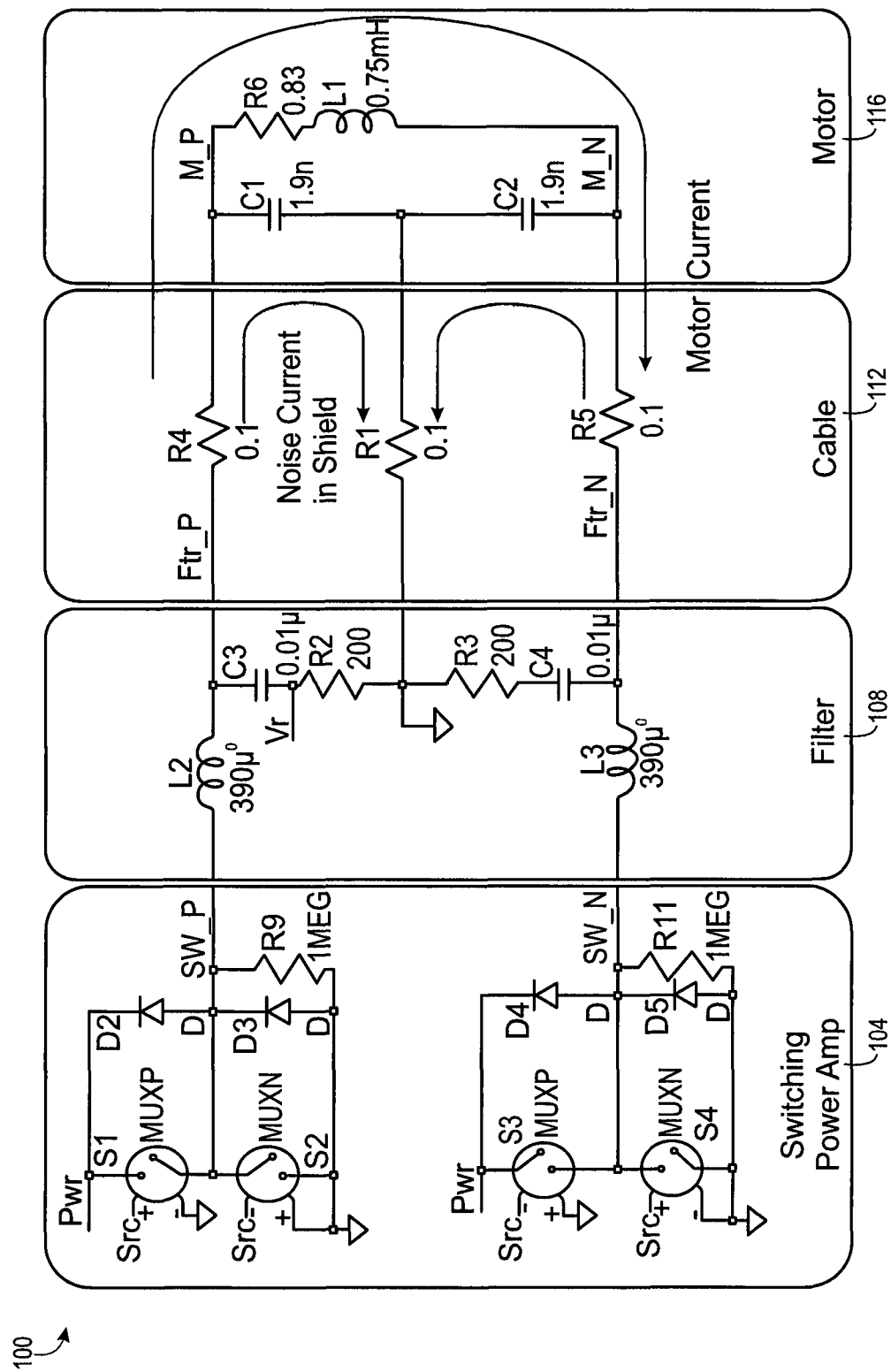
FIG. 1 depicts an example system incorporating a driver circuit in accordance with the prior art.

With reference now to FIG. 1, a conventional motor driver circuit 100 is depicted. The conventional motor driver circuit 100 includes a switching power amplifier section 104, a filter section 108, a cable or transmission section 112, and a high capacitance motor 116. As the power amplifier section 104 is switched on and off to selectively drive current to the motor 116, switching and resonance noise returns through motor capacitance in the cable 112 housing. Where, for example, back shell and shield corrosion has occurred, shield current in the cable 112 housing is blocked, causing the cable 112 to be a radiating antenna. In addition, noise current can be transmitted through a structure to which the motor driver circuit 100 and the high capacitance motor 116 is attached, such as an aircraft frame or other platform. As a result, levels of electromagnetic interference (EMI) associated with the conventional motor driver circuit 100 can exceed acceptable limits.

Figure 2:
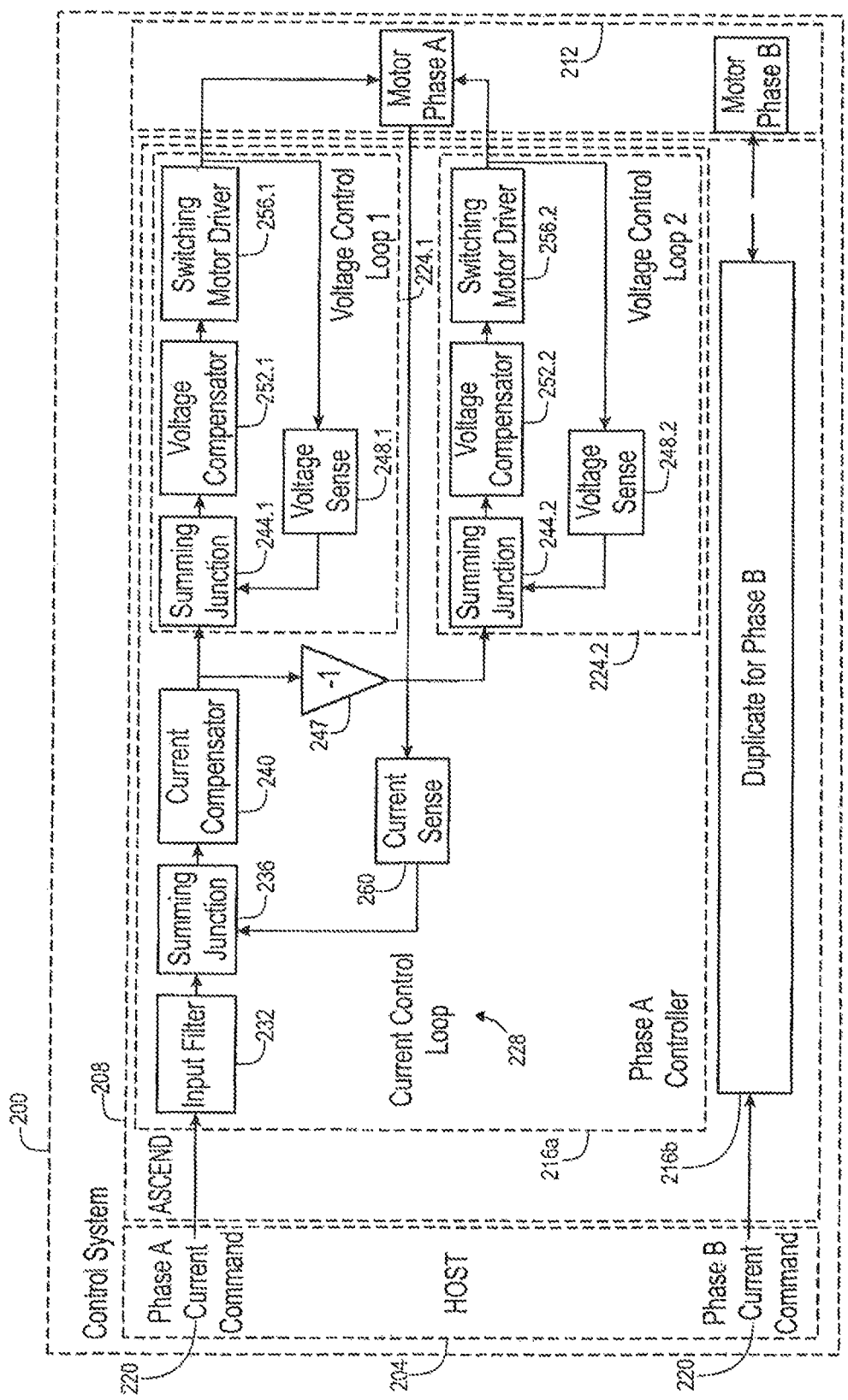
FIG. 2 is a block diagram depicting a driver circuit in accordance with embodiments of the present disclosure.

An analog switching current drive (ASCEND) device or driver device 200 in accordance with embodiments of the present disclosure is depicted in FIG. 2. The driver device 200 eliminates the noise voltage and current in the motor cable, while keeping the thermal and volume efficiency of a switch mode power amplifier, by placing the electrical resonance frequency inside the closed loop bandwidth of the system. This allows the control loop compensators to use the resonance peak as an advantage. The term "compensator" refers to the digital or analog filters that shape the magnitude and phase response of the driver to form a stable control system. The challenge in this approach is dealing with a complicated plant frequency response. The term "plant" is the signal or parameter being controlled. In this case, the plant is the current through the cable between driver electronics and the motor. The plant frequency response will have a resonance peak and a notch caused by the interaction of inductance and capacitance in the driver and motor. A conventional compensator designed to deal with both the peak and the notch is very complicated and is likely to become unstable when electrical parameters shift as a function of temperature.

In accordance with embodiments of the present disclosure, a stable control system is formed using nested control loops to separate the resonance peak from the notch is described herein. In particular, a compensator is designed to control motor voltage which contains the resonance peak but not the notch. Then a compensator is designed to control motor current, but the plant for the current loop includes both voltage control loops at the two ends of a motor phase. That leaves only the notch in the plant frequency response of the current control loop.

As shown in FIG. 2, a driver device 200 in accordance with embodiments of the present disclosure includes a host system 204, a motor or load current control system 208, and a multiple phase motor or other capacitive load 212. The host system 204 provides a current command signal 220 to the control system 208. The functions in the control system 208 can be made using analog circuits or a digital computational device such as a microprocessor or a field programmable gate array (FPGA). As an example, the host system 204 can provide a command signal 220, for instance as a time series of digital or analog values, as part of pointing an instrument or a portion of an instrument in a desired direction or moving it at a desired rate. Accordingly, exemplary embodiments of the present disclosure can be used in connection with a motor provided for moving a fast steering mirror or any other inductive, resistive load with high parallel capacitance. The command signal can be provided on a per phase basis to allow flexibility of where to locate the motor phase commutation functions.

The control system 208 can contain a separate motor phase controller 216 for each phase of the motor 212. Thus, a first motor phase controller 216a is provided for the first phase of the motor 212, a second motor phase controller 216b is provided for the second phase of the motor 212 and not shown are possible additional controllers to drive additional phases in the motor. Each motor phase controller 216 includes a current command input signal 220, a first voltage control loop 224.1, a second voltage control loop 224.2, and a current control loop 228. More particularly, a motor phase controller 216 in accordance with embodiments of the present disclosure can include an input filter 232, summing junction 236, current compensator 240, current sense 260 and voltage command inverter 247. If a motor with more than two phases has internal connections between phases, additional phase controllers may contain only voltage compensators and derive the voltage command inputs from the current compensator 240 for phase A (216a) and phase B (216b). With the exception of the switching motor driver and portions of the current and voltage sense components, which need to be implemented in the analog domain, the various components of the driver device 200 can be implemented in either the analog or digital domains. Moreover, the voltage control loops 224 within a given motor phase controller 216 can be identical to one another. In addition, the motor phase controllers 216 for different phases of a motor 212 can be identical to one another.

The input filter 232 can apply desired spectral shaping of the command signal 220. A summing junction 236 provides a control error signal determined from the difference between the filtered current command received from the input filter 232 and a feedback signal from the current sensor 260. In accordance with at least some embodiments of the present disclosure, the summing junction 236 is implemented using an inverting op amp network. The current compensator 240 receives the error signal from the summing junction 236 and applies spectral shaping to ensure stable control of the current. In accordance with embodiments of the present disclosure, the current compensator 240 implements a type II compensator (proportional-integral with a low pass filter). The output of the current compensator 240 is the positive voltage command signal. The positive voltage command signal is provided to a first voltage control loop 224.1 and to an inverter 247. The inverter 247, which can be implemented by an inverting op-amp network, multiplies the voltage command by −1 to generate the negative voltage command signal, which is provided to a second voltage control loop 224.2.

In accordance with embodiments of the present disclosure, the positive voltage command is provided to a summing junction 244.1 of the first voltage control loop 224.1 and the negative voltage command is provided to a summing junction 244.2 of the second voltage controller 224.2. The summing junctions 244 of the voltage control loops 224 can also receive the feedback signals from corresponding voltage sensors 248 and output the voltage error signals as the difference between the voltage feedback sense value from the respective pole of the motor phase 212 and voltage command signals. A voltage sensor 248 in accordance with embodiments of the present disclosure senses and scales the voltage at the respective pole of the motor phase 212. As an example, the voltage sensor 248 can be implemented by an op-amp network. Where the voltage sensor 248 is partially implemented in the digital domain, the output from the op-amp network can be provided to an analog to digital converter. The resulting sum of the command input and the feedback signal is applied by the respective summing junction 244 to produce an error signal. In accordance with embodiments of the present disclosure, with the voltage control loops 224 can be identical to one another.

The error signal output of the summing junction 244 is provided to a corresponding voltage compensator 252, where spectral shaping can be applied to ensure stable voltage control, and from there to a corresponding switching motor driver 256. More particularly, the voltage compensator 252 can implement a type III compensator (proportional-integral with lead lag and low pass filters). The switching motor driver 256 provides an analog output to drive the load (e.g. a motor phase 212). In accordance with exemplary embodiments of the present disclosure, the switching motor driver 256 is implemented using a gate driver, MOSFETs, and LC reconstruction filter. The output of the switching motor driver 256.1 of the first voltage control loop 224.1 is provided to a first input (e.g. a positive input) of the first phase of the motor 212, and to the voltage sense 248.1. The output of the switching motor driver 256.2 of the second voltage control loop 224.2 is provided to a second input (e.g. a negative input) of the first phase of the motor 212.

A current between the first and second inputs of the first phase of the motor 212 is monitored by a current sense block 260, which provides the current feedback signal to the summing junction 236. The current sense block 260 is implemented at least partially in the analog domain to receive an input signal indicative of the current across the motor phase 212, and to provide that signal to the summing junction 236 of the current control loop 228. For example, the current sense block 260 can include a current sense resistor. The current sense block 260 can additionally include an analog to digital converter, where portions of the current sense block 260 are implemented in the digital domain. By thus nesting the voltage control loops within the current control loop and using a reconstruction filter, conducted EMI can be virtually eliminated from the mechanism control system 200.

Figure 3A:
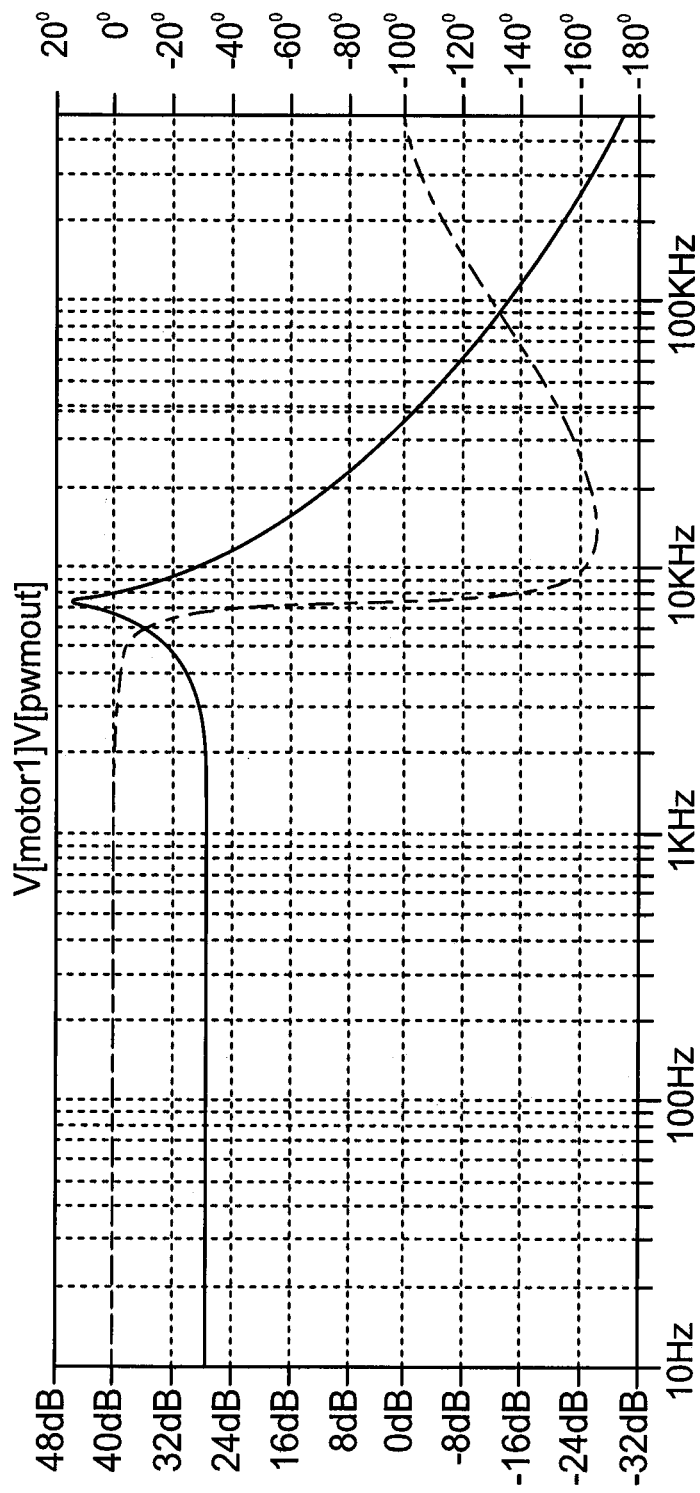
FIGS. 3A-C depict example transfer functions and frequency domain performance results obtained by applying a nested control loop in accordance with embodiments of the present disclosure.
Figure 3B:
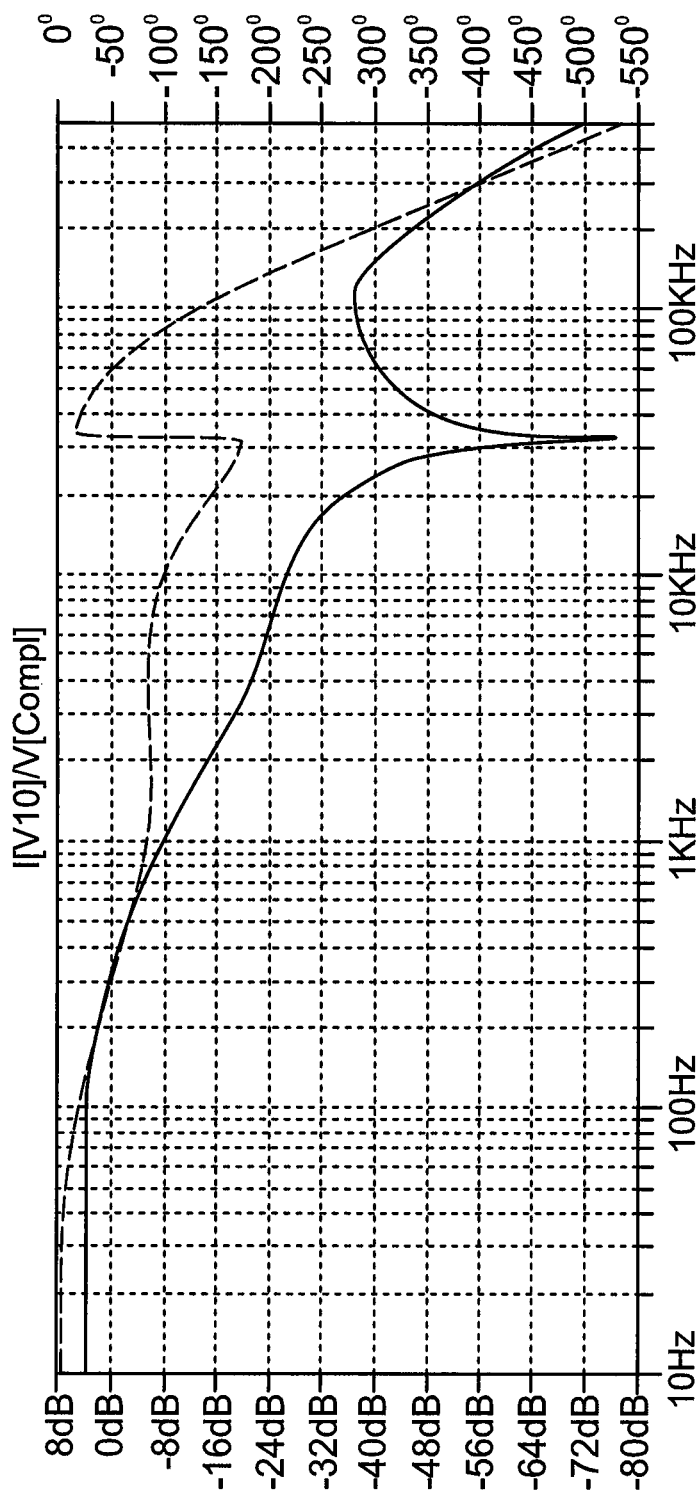
Figure 3C:
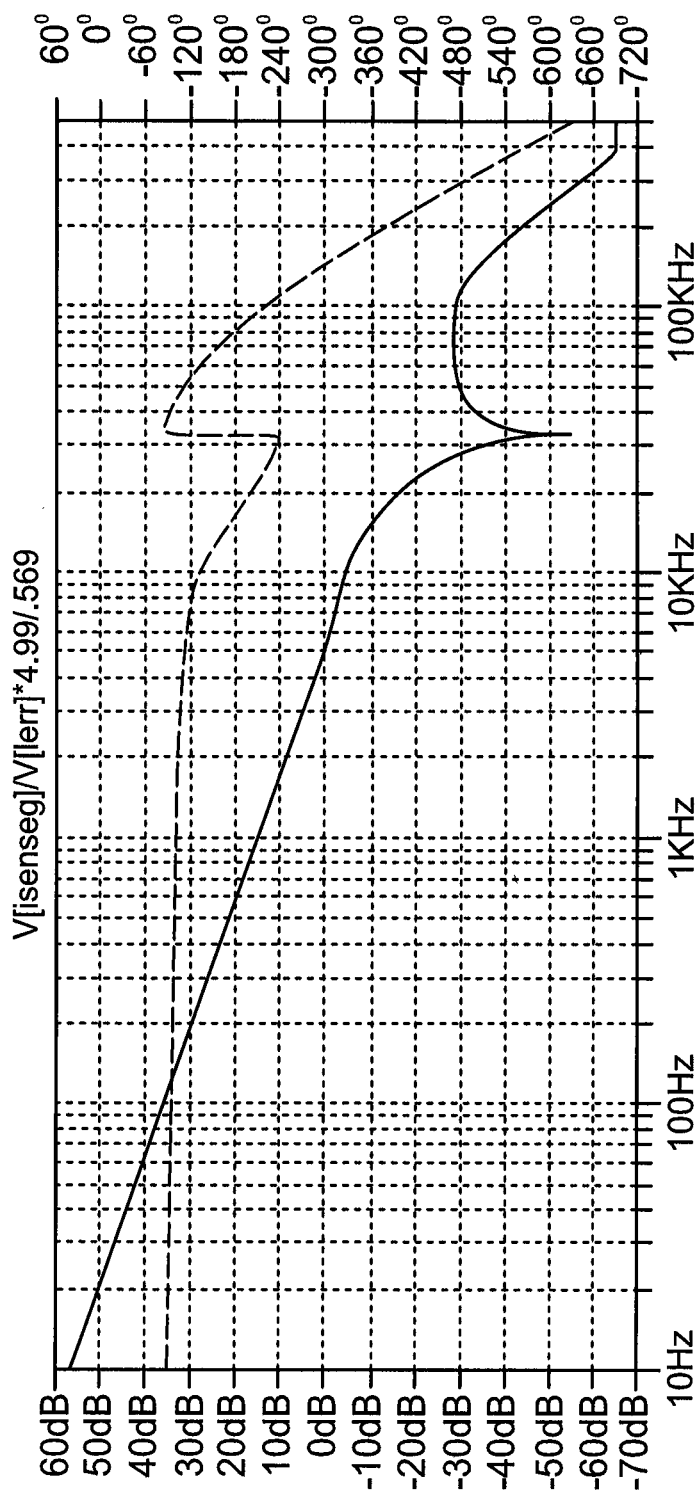

The control system 200 with nested control loops, and in particular the nesting of voltage control loops 224 within a current control loop 228, allows the resonance peak of the system to be separated from the notch. FIGS. 3A-C depict example transfer functions and frequency domain performance results obtained for an exemplary control system 200 in accordance with embodiments of the present disclosure. More particularly, an example motor voltage plant transfer function is depicted in FIG. 3A, and an example motor current plant transfer function is depicted in FIG. 3B. In accordance with embodiments of the present disclosure, the voltage control loops 224 are designed to provide a compensator directed to controlling motor voltage such that the resonance peak, but not the notch, is contained. After the voltage control loops are designed, the current control loop 228 is configured. Because, the voltage control loops 224 are directed to contain the resonance peak, the current control loop 228 can be designed to control the notch in the plant frequency response. As a result, a control system 200 that has robust stability margins can be provided. This is illustrated by FIG. 3C, which continues the example of FIGS. 3A-B, and shows a phase margin of 70 degrees, a gain margin of 11 dB, and a closed loop bandwidth of greater than 4 kHz. Accordingly, embodiments of the present disclosure provide control systems 200 that effectively eliminates noise current through the power supply cable (i.e., the cable between the switching motor drivers 256 and the motor 212, while maintaining the thermal efficiency of a switch mode power amplifier.

Figure 4A:
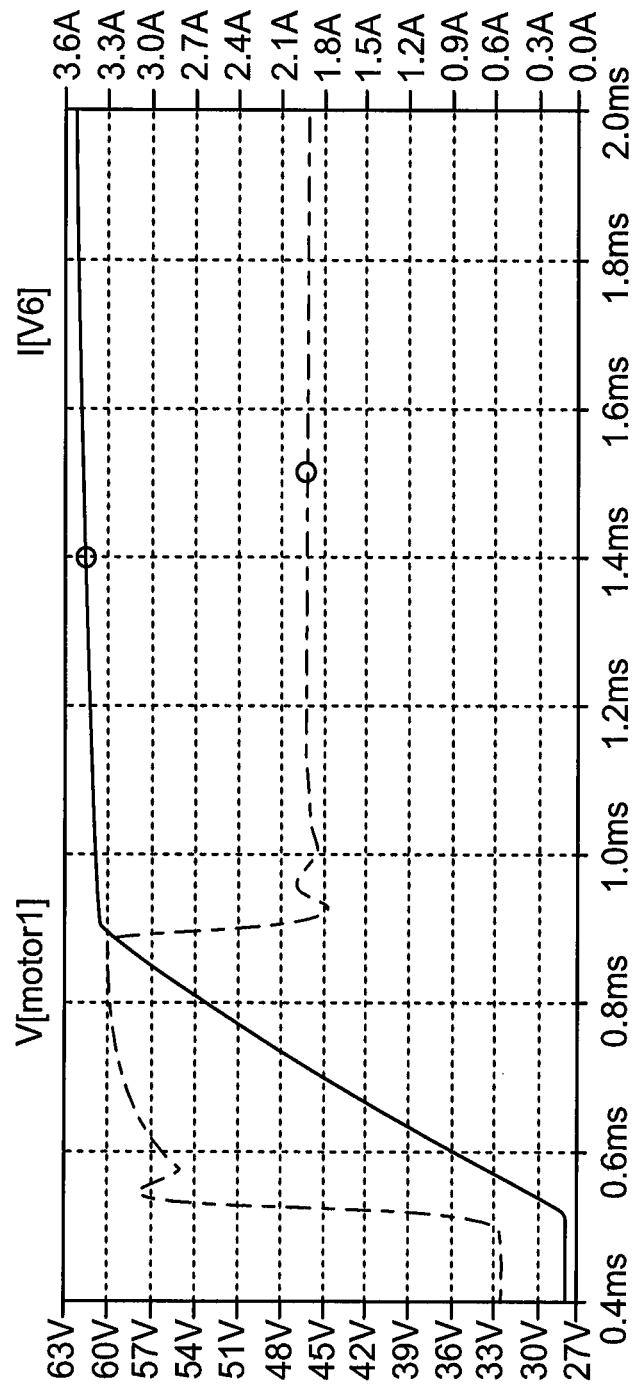
FIGS. 4A-C depict example time domain results obtained by applying a nested control loop in accordance with embodiments of the present disclosure.
Figure 4B:
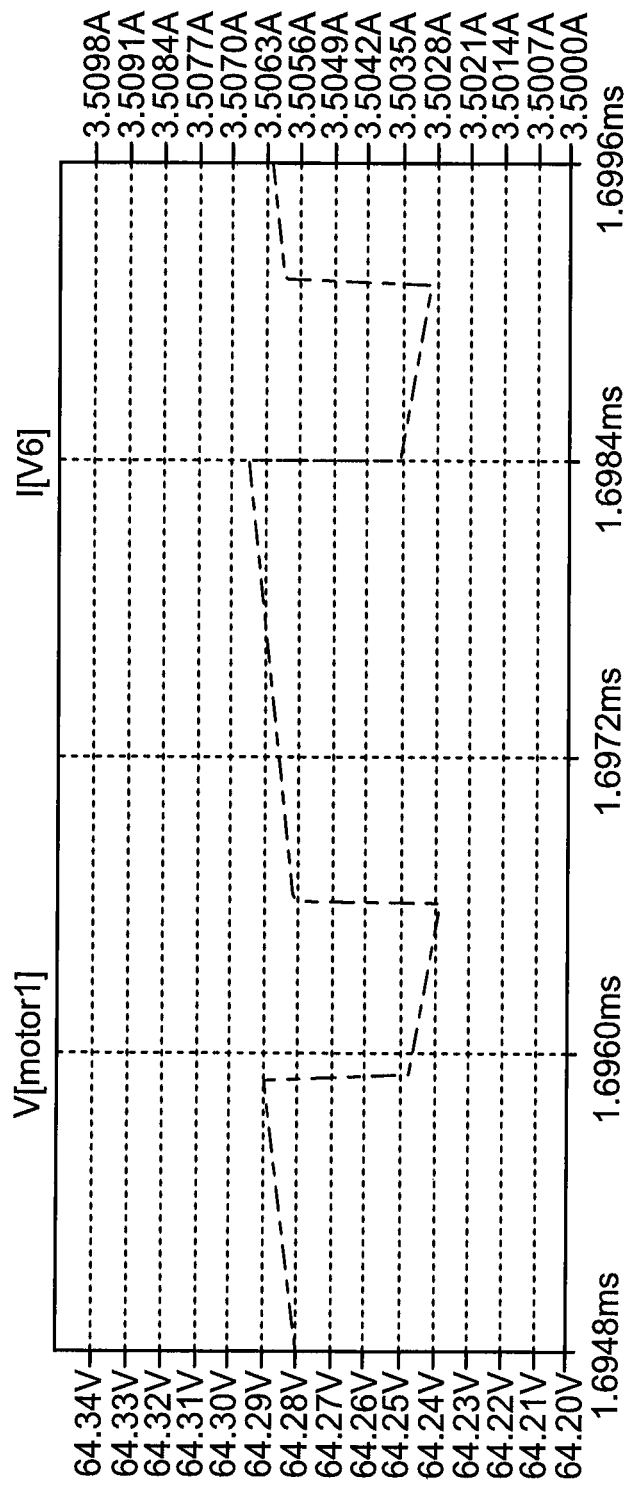
Figure 4C:
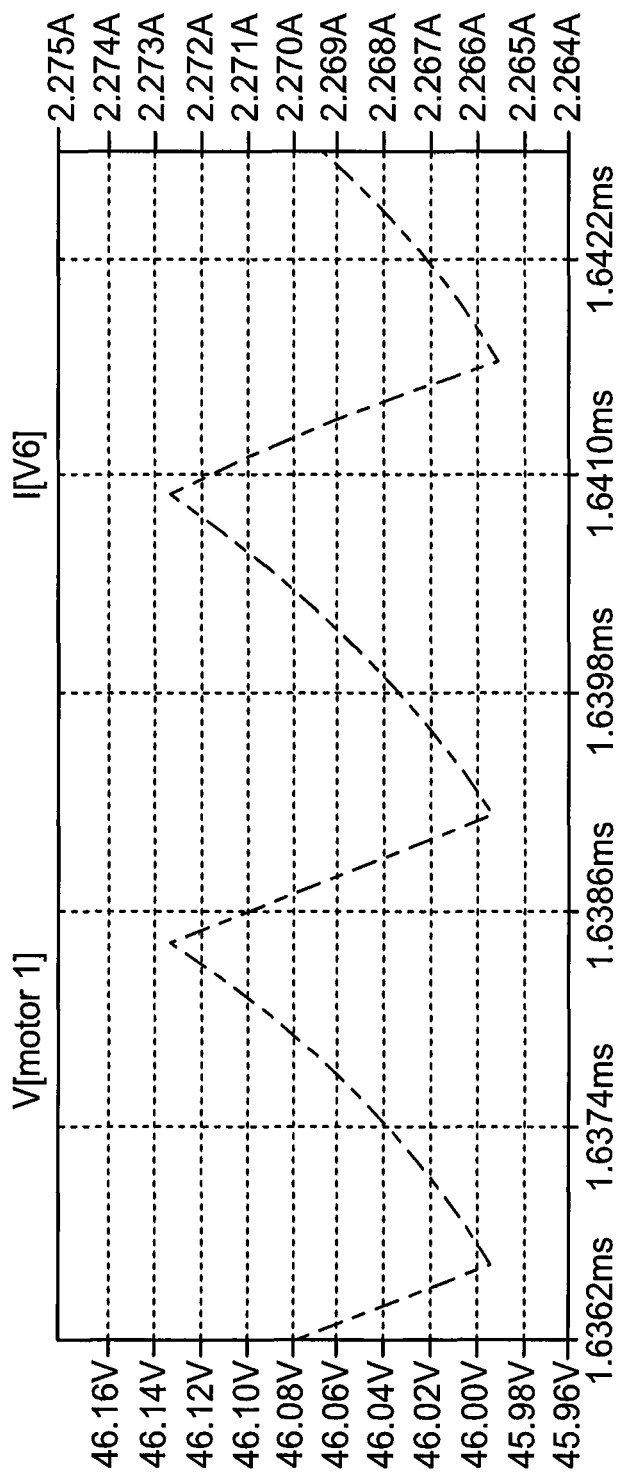

FIGS. 4A-C depict the performance of a control system 200 with nested control loops in accordance with embodiments of the present disclosure. In particular, FIG. 4A is a depiction of the step response of the control system. In this simulation, a relatively large step of input of from 0 to 3.5 A is introduced, with no overshoot or significant oscillations in the motor current. In addition, perturbations in the motor voltage are limited to a single bump as the amplifiers of the motor drivers 256 enter or exit saturation. The resulting peak to peak voltage ripple of about 0.1V (see FIG. 4B) is significantly lower than the goal (in this example) of less than 2.0V, and the resulting peak to peak current ripple of about 10 mA (see FIG. 4C) is significantly lower than the goal (in this example) of less than 30 mA.

In addition to motors having separate phases, embodiments of the present disclosure can be used with motors having phase coils electrically connected in series (delta connected) or with one end of all phase coils connected to the same neutral (wye connected). In a delta connected configuration with N phase coils, there are N electrical terminals, N voltage control loops, and N−1 current control loops. In a wye connected configuration with N phase coils, there are N+1 electrical terminals, N voltage control loops, and N−1 current control loops.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method of controlling a motor, comprising:
providing a current control loop;
providing a first voltage control loop, wherein an output of the current control loop is connected to a summing junction at an input of the first voltage control loop to provide a first voltage command to the first voltage control loop;
connecting an output of the first voltage control loop to a first pole of a first motor;
sensing a voltage of the output of the first voltage control loop to obtain a first voltage feedback sense value;
providing the first voltage feedback sense value to the summing junction at the input of the first voltage control loop;
providing a second voltage control loop, wherein the output of the current control loop is connected to a summing junction at an input of the second voltage control loop by an inverter to provide a second voltage command to the second voltage loop, and wherein the second voltage command is an inverse of the first voltage command;
connecting an output of the second voltage control loop to a second pole of the first motor;
sensing a voltage of the output of the second voltage control loop to obtain a second voltage feedback sense value;
providing the second sensed voltage feedback sense value to the summing junction at the input of the second voltage control loop;
sensing a current between the first and second poles of the first motor; and
providing a sensed current signal as a feedback signal to the current control loop.

2. The method of claim 1, further comprising:
providing a first current command to a first input of the current control loop.

3. The method of claim 2, further comprising:
providing a first drive voltage to the first pole of the first motor from the first voltage control loop; and
providing a second drive voltage to the second pole of the first motor from the second voltage control loop.

4. The method of claim 3, wherein the first pole of the first motor is a first electrical connection of a first phase of the first motor, and wherein the second pole of the first motor is a second electrical connection of the first phase of the first motor.

5. The method of claim 1, further comprising:
providing a current command to an input of the current control loop; and
outputting a positive voltage command from the current control loop, wherein the positive voltage command is input to the first voltage control loop, and wherein a negative voltage command is input to the second voltage control loop.

6. The method of claim 5, wherein the first drive voltage is a positive drive voltage, and wherein the second drive voltage is a negative drive voltage.

7. The method of claim 1, wherein the first and second voltage control loops are configured to implement compensators that control a resonance peak in the frequency response of the first motor.

8. The method of claim 7, wherein, after the first and second voltage control loops are configured, the current control loop is configured to implement a compensator that controls a notch in the frequency response of the first motor.

9. A motor control system, comprising:
a first current control loop;
a first voltage control loop, wherein an output of the first current control loop is connected to a summing junction at an input of the first voltage control loop;
a first voltage sensor, wherein the first voltage sensor is connected to an output of the first voltage control loop, and wherein an output of the first voltage sensor is connected to the summing junction at the input of the first voltage control loop;
an inverter;
a second voltage control loop, wherein the output of the first current control loop is connected to a summing junction at an input of the second voltage control loop by the inverter;
a second voltage sensor, wherein the second voltage sensor is connected to an output of the second voltage control loop, and wherein an output of the second voltage sensor is connected to the summing junction at the input of the second voltage control loop; and
a motor, wherein the output of the first voltage control loop is connected to a first input of a first phase of the motor, wherein the output of the second voltage control loop is connected to a second input of the first phase of the motor, wherein a current sense block included in the first current control loop is connected to the first phase of the motor, and wherein the current sense block is connected to a summing junction of the first current control loop, whereby the first and second voltage control loops are nested within the first current control loop.

10. The motor control system of claim 9, wherein the motor is a single phase motor, and wherein the first current control loop detects the current between the output of the first voltage control loop and the output of the second voltage control loop.

11. The motor control system of claim 9, wherein the motor is a multiple phase motor, and wherein the first current control loop detects the current between the output of the first voltage control loop and the output of the second voltage control loop.

12. The motor control system of claim 9, further comprising:
a third voltage control loop, wherein the motor is a multiple phase motor, and wherein an output of the third voltage control loop is connected to a first input of a second phase of the multiple phase motor.

13. The motor control system of claim 12, wherein the phases of the multiple phase motor are in a Delta configuration.

14. The motor control system of claim 13, wherein the first current control loop detects the current between any two of the first inputs and a second input of one of the phases.

15. A motor system, comprising:
a multiple phase motor, wherein the multiple phase motor includes at least first and second phases;
a first motor phase controller, including:
a first voltage control loop, wherein an output of the first voltage control loop is connected to a first input of the first phase of the motor;
a second voltage control loop, wherein an output of the second voltage control loop is connected to a second input of the first phase of the motor;
a first current control loop, wherein the first current control loop outputs a first voltage command to a summing block at an input of the first voltage control loop and outputs an inverted version of the first voltage command to a summing block at an input of the second voltage control loop, wherein a voltage at the first input of the first phase of the motor is sensed and a corresponding voltage signal is provided to the summing block at the input of the first voltage control loop, wherein a voltage at the second input of the first phase of the motor is sensed and a corresponding voltage signal is provided to the summing block at the input of the second voltage control loop, wherein a current between the first and second inputs of the first phase of the motor is detected by and a current feedback signal is provided to a summing junction of the first current control loop, and wherein the first and second voltage control loops are nested within the first current control loop;
a second motor phase controller, including:
a third voltage control loop, wherein an output of the third voltage control loop is connected to a first input of the second phase of the motor;
a fourth voltage control loop, wherein an output of the fourth voltage control loop is connected to a second input of the second phase of the motor; and
a second current control loop, wherein the second current control loop outputs a second voltage command to a summing block at an input of the third voltage control loop and outputs an inverted version of the second voltage command to a summing block at an input of the fourth voltage control loop, wherein a voltage at the first input of the second phase of the motor is sensed and a corresponding voltage signal is provided to the summing block at the input of the third voltage control loop, wherein a voltage at the second input of the second phase of the motor is sensed and a corresponding voltage signal is provided to the summing block at the input of the fourth voltage control loop, wherein a current between the first and second inputs of the second phase of the motor is detected and a current feedback signal is provided to a summing junction of the second current control loop, and wherein the third and fourth voltage control loops are nested within the second current control loop.

16. The motor system of claim 15, wherein the first and second voltage control loops include elements that are duplicates of one another.

17. The motor system of claim 15, wherein the first and second current control loops, and the first, second, third, and fourth voltage control loops include elements that are duplicates of one another.

18. The motor system of claim 15, wherein each of the current control loops includes an inverter that outputs the respective inverted voltage command.

* * * * *